United States Patent
Lorenz

(10) Patent No.: US 6,464,253 B1
(45) Date of Patent: Oct. 15, 2002

(54) VEHICULAR RESTRAINT SYSTEM

(75) Inventor: Christian Lorenz, Leidersbach (DE)

(73) Assignee: TRW Automotive Safety Systems GmbH & Co., KG, Aschaffenburg (DE)

( * ) Notice: Subject to any disclaimer, the term of this patent is extended or adjusted under 35 U.S.C. 154(b) by 0 days.

(21) Appl. No.: 09/501,028

(22) Filed: Feb. 9, 2000

(30) Foreign Application Priority Data

Feb. 9, 1999 (DE) .......................................... 299 02 273

(51) Int. Cl.[7] ............................................... B60R 21/28
(52) U.S. Cl. ........................ 280/731; 280/736; 280/741; 102/530
(58) Field of Search ................................ 280/731, 736, 280/741; 102/530, 531

(56) References Cited

U.S. PATENT DOCUMENTS

| | | | | |
|---|---|---|---|---|
| 2,984,558 A | * | 5/1961 | Edward | |
| 3,532,360 A | * | 10/1970 | Leising et al. | 280/741 |
| 3,606,377 A | * | 9/1971 | Martin | 280/741 |
| 3,715,984 A | * | 2/1973 | Murray | 102/34.2 |
| 3,724,870 A | * | 4/1973 | Kurokawa et al. | 280/741 X |
| 4,115,167 A | * | 9/1978 | Sbrocca | 102/530 X |
| 5,066,039 A | * | 11/1991 | Shitanoki et al. | 280/741 |

FOREIGN PATENT DOCUMENTS

| | | |
|---|---|---|
| DE | 3913034 A1 | 11/1989 |
| DE | 3824162 A1 | 1/1990 |
| DE | 4116879 A1 | 11/1992 |
| DE | 4116880 A1 | 11/1992 |
| DE | 4116882 A1 | 12/1992 |
| DE | 4108225 C1 | 3/1993 |

* cited by examiner

Primary Examiner—Paul N. Dickson
Assistant Examiner—Toan To
(74) Attorney, Agent, or Firm—Tarolli, Sundheim, Covell, Tummino & Szabo L.L.P.

(57) ABSTRACT

A vehicular restraint system comprises an inflatable gas bag defining an internal volume and a gas generator with a pyrotechnic propellant charge for generating gas upon inflation of the gas bag. The propellant charge is made up of a mass of a pyrotechnic material. The mass of the pyrotechnic material may include a binding agent conglomerating the mass into a rigid shaped body, such body having a surface exposed to the internal volume of the gas bag, or the mass is filled into a flexible envelope, which envelope has a surface exposed to the internal volume of the gas bag. Preferably, the mass has a ductile texture, enabling it to be kneaded.

4 Claims, 1 Drawing Sheet

VEHICULAR RESTRAINT SYSTEM

BACKGROUND OF THE INVENTION

Such gas bags or air bags were arranged, at first, in the steering wheel of the vehicle, later to be supplemented by the so-called front-passenger air bag, they since having become standard also as side air bags on a series of vehicle types. Further air bags for specific impact areas or situations are now in development which are likewise already being offered by automotive manufacturers as an optional or even standard fitting.

In steering wheel air bag modules, since having become most developed, the propellant charge on nearly all models is accommodated in a cylindrical housing having gas exit ports. Only a few housing shapes, hardly differing from each other, have been developed due to the requirements dictated by rational production and safety standards in handling pyrotechnical material, as a result of which the outer shape of the air bag modules and the space to be made available for installation thereof are dictated by the shape of the housing for the pyrotechnical propellant charge. This is why, in general, a steering wheel needs to be completely newly designed in accommodating an air bag module, the same applying also to all other installation locations in the body of the vehicle, of course, which need to be reconfigured more or less for the installation of an air bag module. The considerable additional costs involved contrast with the desired further improvement in the passive safety in motor vehicles.

BRIEF SUMMARY OF THE INVENTION

The invention provides a vehicular restraint system that obviates the limitations involved in usual housing shapes for a pyrotechnical propellant charge so that air bag modules may be designed more freely and easier to adapt to existing installation spaces.

According to one aspect of the invention, the vehicular restraint system comprises an inflatable gas bag defining an internal volume and a gas generator with a pyrotechnic propellant charge for generating gas upon inflation of the gas bag. The propellant charge comprises a mass of a pyrotechnic material. The mass includes a binding agent conglomerating the mass into a rigid shaped body. The body has a surface exposed to the internal volume of the gas bag.

According to a further aspect of the invention the vehicular restraint system comprises an inflatable gas bag defining an internal volume and a gas generator with a pyrotechnic propellant charge for generating gas upon inflation of the gas bag. The propellant charge comprises a mass of a pyrotechnic material. The mass is filled into a flexible envelope which has a surface exposed to the internal volume of the gas bag.

As an alternative it is proposed that in employing a suitable binding agent the complete mass of the pyrotechnical propellant is conglomerated into a one-piece, kneadable shaped body capable of being pressed into an available installation space.

Configuring the pyrotechnical. propellant charge for generating filling gases for instantly inflating a gas bag in accordance with the invention as a rigid or plastic shaped body enables it to be adapted to or kneaded into the available space substantially easier, this generally having the effect that the available space for installation needs to be altered either not at all or only slightly and that the air bag module as a rule necessitates only little space for installation since dead space, formerly not made use of or hardly at all, may now be put to use fully or in part. In addition to this there is now no need for the housing usually to be of steel, as a result of which the air bag module becomes much lighter in weight.

The necessary ignition device may now be integrated easier in the shaped body in accordance with the invention. In a further embodiment of the gist of the invention it is provided for that the shaped body comprises an envelope of paper, textile material, plastic foil or some other easily fashionable sheet material, whereby this envelope is not intended to replace the hitherto conventional rigid housing but simply to supplement the function of the binding agent and to prevent crumbling and uncontrolled loss of propellant charge particles from the shaped body in handling.

Another advantage afforded by the invention is that the mass of the propellant charge may now be easily distributed to two or more shaped bodies, to each of which an ignition device is assigned, thus enabling the consumption response to be influenced and deployment of the gas bag to be controlled.

BRIEF DESCRIPTION OF THE DRAWINGS

Further details and advantages will now be explained for example embodiments with reference to the drawings in which.

DETAILED DESCRIPTION OF THE INVENTION

Figure 1:
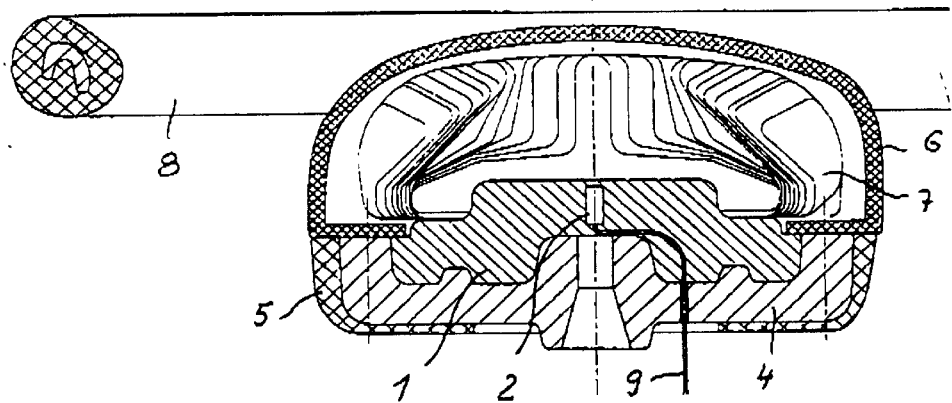
FIG. 1 is an illustration of a first embodiment of the gist of the invention for a steering wheel air bag.

Referring now to FIG. 1, there is illustrated in a partial section a steering wheel in which a hub portion 4 is surrounded by a sheathing 5 forming together with the cover cap 6 the space for accommodating the folded gas bag 7 and the propellant charge. In this arrangement with the employment of a suitable binding agent the mass of the pyrotechnical material is conglomerated into a shaped body 1, the dimensions of which are adapted to the space available for installation. In the present case the space available for installation is indicated in the section illustration of the shaped body 1 which may be, as viewed from above, of revolution, square, rectangular or shaped otherwise. It will be appreciated that the installation space as shown is intended merely as an example, i.e. the shaped body 1 may be shaped either simpler or more complicated as required.

Reference numeral 8 identifies a part of the steering wheel rim and reference numeral 9 identifies a cable for the ignition device 2.

Figure 2:
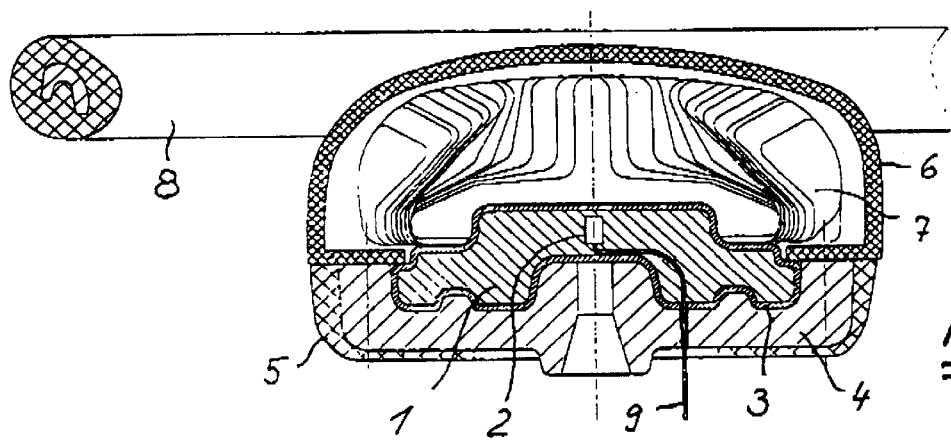
FIG. 2 is an illustration of a second embodiment of the gist of the invention.

Referring now to FIG. 2 there is illustrated an arrangement differing from that as shown in FIG. 1 simply by the shaped body 1 comprising an envelope 3 of a flexible material. This envelope is intended to be made of a material which may be easily adapted to a given space available for installation and is easily shaped when the propellant charge consists of a plastic shaped body. The material of the envelope may be paper, textile fabric or a plastics foil.

Figure 3:
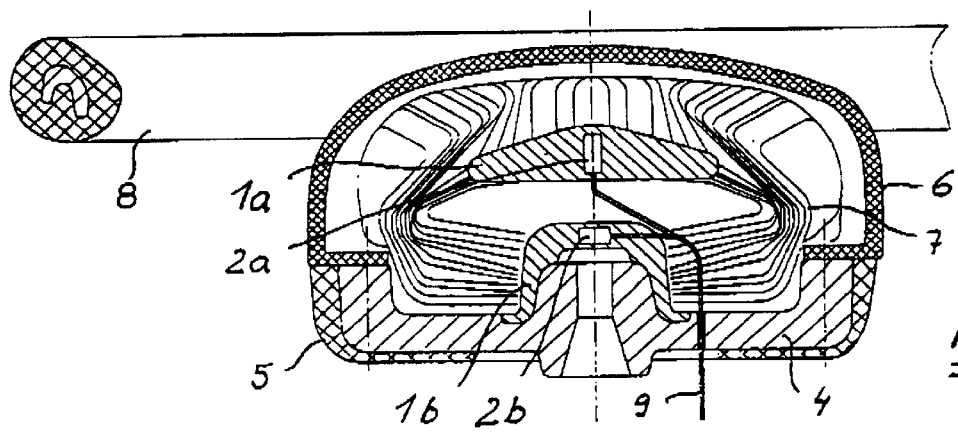
FIG. 3 is an illustration of a third embodiment of the gist of the invention.

Referring now to FIG. 3 there is illustrated another arrangement differing from that as shown in FIG. 1 simply by two shaped bodies 1a and 1b being provided, each with an ignition device 2a and 2b, it being likewise intended that they may be easily adapted to or urged into a given space available for installation. As already mentioned, making use of several shaped bodies has the advantage that it is now additionally possible to influence the response of consumption and to control the deployment of the gas bag.

Preferably, the propellant charge has a mass of a ductile texture, allowing the mass to be kneaded into a predefined space or accommodation.

What is claimed is:

1. A vehicular restraint system comprising:

a vehicle steering wheel having a hub, said hub having a recess of a predefined shape, an inflatable gas bag defining an internal volume, and a gas generator with a pyrotechnic propellant charge for generating gas for inflating said gas bag, said propellant charge comprising a mass of pyrotechnic material, said mass of pyrotechnic material including a binding agent conglomerating said mass into a rigid shaped body, said rigid shaped body being accommodated in said recess of said hub without being accommodated in an additional housing, said rigid shaped body having a shape complementary to said recess of said hub, and said rigid shaped body further having a surface exposed to said internal volume of said gas bag.

2. A vehicular restraint system according to claim 1, wherein said mass has at least one igniter incorporated therein.

3. A vehicular restraint system comprising:

a vehicle steering wheel having a hub, said hub having an outer wall and a recess of a predefined shape, said shape of said recess being defined by said outer wall, an inflatable gas bag defining an internal volume, and a gas generator with a pyrotechnic propellant charge for generating gas for inflating said gas bag, said propellant charge comprising a mass of pyrotechnic material, said mass of pyrotechnic material being accommodated in said recess of predefined shape without being accommodated in an additional housing, said mass having a ductile texture and being kneadable into said recess of said hub, said mass further having a surface exposed to said internal volume of said gas bag.

4. A vehicular restraint system according to claim 3 where in said mass has at least one igniter incorporated therein.

* * * * *